United States Patent
Lindsay et al.

(10) Patent No.: US 7,071,268 B1
(45) Date of Patent: Jul. 4, 2006

(54) ELECTRO-OPTIC POLYMERS WITH TUNABLE REFRACTIVE INDEX FOR OPTICAL WAVEGUIDES

(75) Inventors: Geoffrey Andrew Lindsay, Ridgecrest, CA (US); Peter Zarras, Ridgecrest, CA (US); John D. Stenger-Smith, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 230 days.

(21) Appl. No.: 10/615,460

(22) Filed: Jul. 2, 2003

Related U.S. Application Data

(63) Continuation-in-part of application No. 09/662,383, filed on Aug. 25, 2000, now abandoned.

(51) Int. Cl.
*C08L 63/00* (2006.01)
*C08L 63/02* (2006.01)

(52) U.S. Cl. .................................... 525/527

(58) Field of Classification Search ............. None
See application file for complete search history.

(56) References Cited

U.S. PATENT DOCUMENTS

| | | | | |
|---|---|---|---|---|
| 4,859,876 | A | 8/1989 | Dirk et al. | 307/425 |
| 5,208,299 | A | 5/1993 | Bales et al. | 525/437 |
| 5,247,055 | A | 9/1993 | Stenger-Smith et al. | 528/310 |
| 5,288,816 | A | 2/1994 | Inbasekaran et al. | 525/502 |
| 5,445,854 | A * | 8/1995 | Newsham et al. | 385/5 |
| 5,520,968 | A | 5/1996 | Wynne et al. | 428/1 |
| 5,776,374 | A * | 7/1998 | Newsham et al. | 252/582 |
| 6,291,545 | B1 * | 9/2001 | Imamura | 522/181 |
| 6,348,992 | B1 | 2/2002 | Zhang et al. | |

FOREIGN PATENT DOCUMENTS

| EP | 218938 A2 | 4/1987 |
|---|---|---|
| EP | 218938 | 8/1989 |

OTHER PUBLICATIONS

CAPLUS accession No. 1987:120623 for Nakamura et al., Kenkyu Jitsuyoka Hokoku—Denki Tsushin Kenkyusho, vol. 35, No. 11, 1986, abstract.*

CAPLUS accession No. 1995:897461 for Mang et al., Materials Research Society Symposium Proceedings, 392, 1995, abstract.*

He et al., "Synthesis of Chromophores with Extremely High Electro-optic Activities. 2. Isophorone- and Combined Isophorone-Thiophene-Based Chromophores," Chemical Materials, vol. 14, 2002, pp. 4669-4675.*

Luo et al., Design, Synthesis, and Properties of Highly Efficient Side-Chain Dendronized Nonlinear Optical Polymers for Electro-Optics, Advanced Materials, vol. 14, No. 23, Dec. 3, 2002, pp. 1763-1768.*

* cited by examiner

*Primary Examiner*—Robert Sellers
(74) *Attorney, Agent, or Firm*—Charlene A. Haley

(57) ABSTRACT

An electro-optic (EO) polymer that has a tunable index of refraction and are synthesized by the copolymerization a bisphenol monomer including a chromophoric structure and two diepoxy monomers. One diepoxy monomer includes at least one fluorine atom, and the second diepoxy monomer includes no fluorine atoms. The EO films are prepared by applying an electric field across the film as the film is heated to its glass transition temperature. The electric field is removed after cooling the film. The index of refraction of these nonlinear optical polymer materials is tuned between about 1.58 to about 1.66 (measured with light having a wavelength of about 1.3 microns).

7 Claims, 1 Drawing Sheet

ELECTRO-OPTIC POLYMERS WITH TUNABLE REFRACTIVE INDEX FOR OPTICAL WAVEGUIDES

CROSS REFERENCE TO RELATED APPLICATIONS

This application is a continuation-in-part to commonly owned non-provisional U.S. patent application Ser. No. 09/662,383, titled "Electro-Optic Polymers With Tunable Refractive Index For Optical Waveguides," filed Aug. 25, 2000 now abandoned, which claims priority to the related subject matter.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention relates to electro-optic ("EO") polymers exhibiting nonlinear optical properties, and the electro-optical film products processed thereof. More particularly, polymeric compositions are obtained by the process of polymerizing at least one bisphenol monomer including at least one nonlinear optical chromophore with at least two diepoxy monomers including at least one diepoxy monomer having at least one fluorine atom, and at least one diepoxy monomer having no fluorine atoms, and selecting the ratio of fluorinated to nonfluorinated diepoxy monomers to tune the index of refraction between the ranges of about 1.58 to about 1.66 measured at a wavelength of about 1300 nm.

BACKGROUND OF THE INVENTION

Information can be encoded on the optical carrier signal in a fiber optic communication network using an electro-optic (EO) modulator. In these modulators, nonlinear optic (NLO) materials having second-order NLO activity are necessary to effect modulation of the light signal.

Polymeric thin films containing asymmetrical chromophores, in a polar orientation, have been under investigation for their second-order NLO, piezoelectric, and/or pyroelectric properties for many years. This area of research has yielded several types of versatile polymers useful for applications such as optical second harmonic generation and EO modulation of optical signals. The following information is provided as a brief overview of technology relevant to these NLO materials. For a more detailed discussion involving this technology please refer to U.S. Pat. No. 5,247,055 issued to Stenger-Smith et al., Sep. 21, 1993; U.S. Pat. No. 5,520,968, issued to Wynne et al., May 28, 1996; and the book, Polymers for Second-Order Nonlinear Optics, G. A. Lindsay and K. D. Singer, Eds., Am. Chem. Soc. Advances in Chemistry Series 601, Washington, D.C., 1995, and references therein.

Organic polymeric thin films for photonic applications has been a rapidly evolving area of research for over 15 years. One class of materials within this field, nonlinear optical polymer (NLOP) films, has potential for breakthroughs in low cost integrated devices for the telecommunication and data-communication industries. Key components of this new technology are EO waveguides made from second-order NLOP films. These waveguides can switch optical signals from one channel to another and can modulate the phase or amplitude of an optical signal by means of applying an electric field across the channel.

NLO materials used in EO devices have, in general, been inorganic single crystals such as lithium niobate ($LiNbO_3$) or potassium dihydrogen phosphate (KDP). More recently, NLO materials based on organic molecules, and in particular polar organic chromophores have been developed.

Organic NLO materials have a number of potential advantages over inorganic materials. First, some organic NLO materials have a higher electro-optic coefficient (r33). [See U.S. Pat. No. 6,348,992; Chemistry of Materials 2002, volume 14, pp. 4669–4675; and Advanced Materials 2002, volume 14, pp. 1763–1768 and references therein.] Second, the low index of refraction of organic materials (e.g., 1.3 to 1.7) compared to that of inorganic materials (e.g., 2.1 to 3.5) leads to lower optical loss due to less reflection when coupling the optical modulator to an optical fiber. Third, the organic materials can be easily fabricated into integrated device structures when used in polymer form.

EP 218,938 and U.S. Pat. No. 4,859,876 issued to Dirk et al., Aug. 22, 1989 have used an approach of incorporating NLO-active guest chromophores into amorphous polymer host matrices by blending. Such polymeric materials have the advantages of being easily fabricated into thin films suitable for integrated optical devices. In order for the film containing organic chromophores to have NLO activity, the chromophores must be given a polar orientation to achieve a non-centrosymmetric alignment. Such alignment is usually achieved by the application of an electric field across the film thickness while the temperature of the polymeric blend is above or near its glass transition temperature ($T_g$). The polymer is then cooled with the field on to lock the oriented molecules in place. EP 218,938 discloses a number of polymer host materials, including epoxies, and many types of chromophores which have NLO activity including azo dyes such as Disperse Red 1. It is known that an NLO active material such as azo dye Disperse Red 1, (4-[N-ethyl-N-(2-hydroxyethyl]amino-4-nitro azobenzene), may be incorporated into a host by simply blending the azo dye in a thermoplastic material such as poly(methylmethacrylate), as described U.S. Pat. No. 4,859,876.

While the doped polymer approach offers some advantages over organic and inorganic crystals, the approach has a number of problems. First, the stability of the NLO activity over time of such materials has been shown to be less than desired.

In addition, the guest NLO chromophores blended in a polymer plasticize the polymer host matrix, lowering the glass transition temperature ($T_g$). Lowering the polymer $T_g$ reduces the thermal stability of the NLO film or NLO medium. Near the $T_g$, segments of the polymer become mobile and the NLO active guest chromophores, which were oriented by electric-field poling undergo orientational relaxation. Once orientational relaxation has occurred, the NLO medium exhibits no NLO activity.

A third problem with the guest-host NLO polymers are the often-found poor solubility of the NLO chromophore in the host matrix. The guest chromophores can aggregate at relatively low doping levels (5–20 percent w/v). Such aggregates scatter light and reduce the transparency of the waveguides to unacceptable levels.

One method to improve the orientation stability is to attach the chromophore to a polymer backbone. There have been many examples of this in literature. U.S. Pat. No.

5,208,299 issued to Bales, et al., May 4, 1993, concerns making arylhydrazones and polymerizing them with other commoners resulting in optically transparent polymers that exhibiting second-order NLO activity upon orientation. In addition, U.S. Pat. No. 5,208,299 discloses polymers comprising the NLO materials or medium having a relatively high $T_g$, resulting in high temperature stability. However, U.S. Pat. No. 5,208,299 does not provide the index tunability of the preferred embodiment of the present invention.

U.S. Pat. No. 5,288,816 issued to Inbasekaran, et al., Feb. 22, 1994, discloses NLO aminoaryl hydrazones as curing agents for epoxy resins, and as suitable monomers for polymeric compositions such as poly(amino ethers), polyimides, polyamides, and polyureas. Also disclosed are epoxy polymers or epoxy based polymers containing covalently bonded aminoaryl hydrazone moieties in the structure of the polymers exhibiting enhanced nonlinear optical activity and stability. In addition, similar to U.S. Pat. No. 5,208,299, U.S. Pat. No. 5,288,816 discloses an invention in which the polymers comprising the NLO materials have a relatively high $T_g$, resulting in high temperature stability of the NLO material. However, U.S. Pat. No. 5,288,816 does not disclose the index tunability of the preferred embodiment of the present invention.

SUMMARY OF THE INVENTION

The present invention includes EO polymers having a tunable index of refraction and a desirable balance of the following characteristics: a) high EO coefficient, b) low optical loss, c) high thermal stability, and d) crosslinkability. Embodiments of these polymers include the copolymerization of bisphenol monomers having at least one chromophore attached and at least two diepoxy monomers. At least one diepoxy monomer includes at least one fluorine atom. At least one diepoxy monomer includes no fluorine atoms. These EO polymers have a linear backbone produced from the reaction of the phenol groups with the epoxy (oxirane) groups. The molecular weight of these polymers range from about 10,000 to 100,000 grams per mole (or Daltons). Polymers having a high level of fluorinated epoxy monomer have a relatively low refractive index. Conversely, polymers having a low level of fluorinated epoxy monomer have a relatively high refractive index. Bisphenols also include nitrophenyl hydrazone chromophores. However, other embodiments include bisphenols having nitrophenyl azo, azomethine, and stilbene chromophore attached.

This combination of chemical structures provides a tunable index of refraction, low optical loss, and crosslinkability in the OE core polymer for the efficient fabrication of optic circuits. The polymers of this invention have an optimum balance of the following characteristics: a) high optical transparency, b) resistance to solvents, c) adhesion to substrates, d) high EO coefficient, and e) high thermal stability.

The present invention tunes the index of refraction of an EO polymer to a degree of accuracy of ±0.002 index units between a refractive index of 1.58 and 1.65 measured at about 1.3 microns wavelength. These index of refraction values are measured by the prism-coupling method on a polymer film deposited on a silica glass substrate in the unpoled condition. A "poled" film, as opposed to an "unpoled" film, is one that has been subjected to a high voltage at a temperature near the $T_g$ and cooled to room temperature before removing the applied voltage.

Embodiments of the present invention provide a polymer, which achieves a superior balance of the following characteristics: a) high EO coefficient, b) low optical loss, c) high thermal stability, and d) crosslinkability. Other embodiments of the present invention provide two diepoxy monomers in the same NLOP to permit tuning the index of refraction.

DETAILED DESCRIPTION OF THE INVENTION

Figure 1:
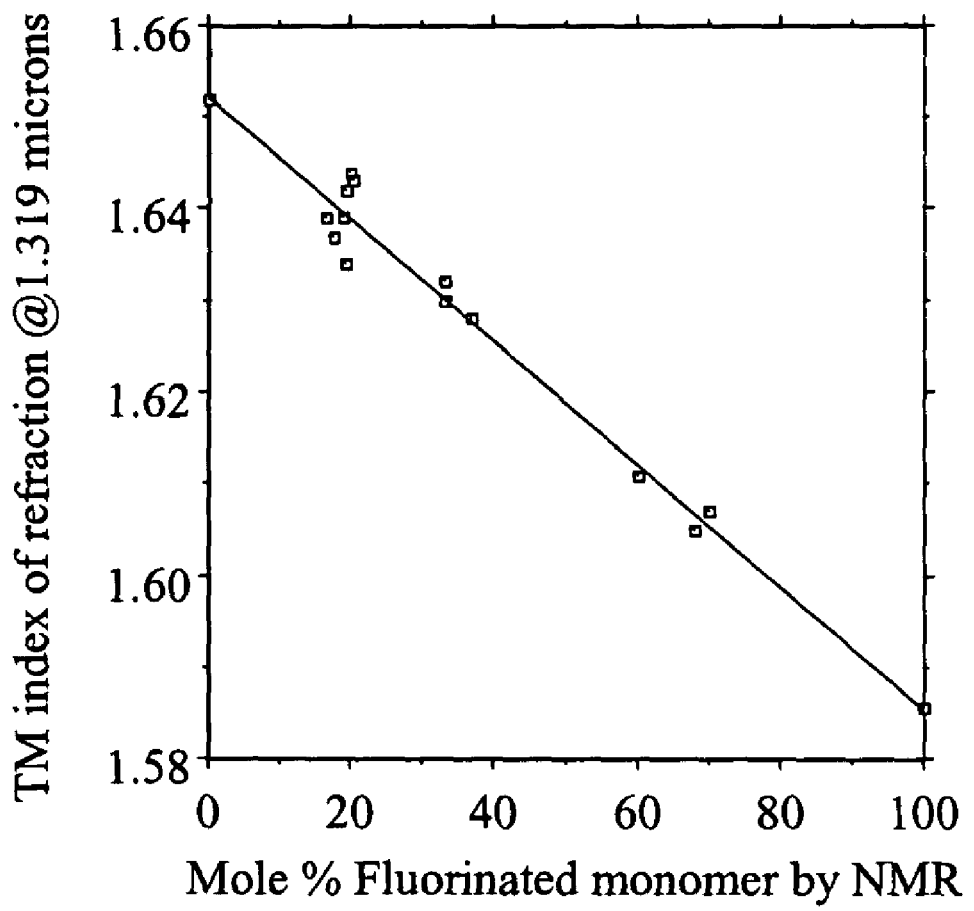
FIG. 1 is a graph of The Index of Refraction at 1.319 microns v. Mole % Fluorinated Monomer by NMR.

The present invention includes EO polymers that have a tunable index of refraction and a desirable balance of the following characteristics: a) high EO coefficient, b) low optical loss, c) high thermal stability, and d) crosslinkability. Embodiments of the present include a linear polymer comprising the polymerization of at least one bisphenol monomer attached to at least one first diepoxy monomer having at least one fluorine atom, and at least one second diepoxy monomer having no fluorine atoms. The present invention tunes the index of refraction of an EO polymer to a degree of accuracy of ±0.002 index units between a refractive index of about 1.58 to about 1.65 measured at about 1.3 microns wavelength. The molecular weight of these polymers range from about 10,000 to 100,000 grams per mole (or Daltons).

For the purposes of the present invention, a high EO coefficient is greater than 10 pm/V. A low optical loss is less than 3 dB/cm waveguide propagation loss. High thermal stability is less than 10% decrease in EO coefficient upon heating the film at 1°/minute to 85° C. In this polymer, good adhesion is obtained when the film does not come loose from a substrate after baking it at 150° C. for two hours and cooling to room temperature.

The polymer films of embodiments of the present invention are produced by the copolymerization of a chromophore including a bisphenol structure and two different diepoxy structures. Embodiments of the present invention combines the following monomers in a polymer including: about 50 mole % a bisphenol chromophoric monomer; about 1 to about 49 mole % of a first diepoxy monomer, wherein the first diepoxy monomer includes at least one fluorine atom; and about 1 to about 49 mole % of a second diepoxy monomer, wherein the second diepoxy monomer includes no fluorine atoms.

To make the present polymers, these monomers are added to a high-boiling solvent, such as dimethyl formamide, 2-methoxyethyl ether, N-methyl pyrrolidinone, and phenoxy 2-propanol or veratrole. Next, a catalyst, such as alkyl triphenyl phosphonium acetate, sodium acetate or a tertiary amine, is added. The mixture is heated to reflux (not to exceed 165° C.) for an hour. In embodiments of the present invention, when the time and/or temperature are exceeded, gel or branched polymer will result. The resulting polymer is precipitated into absolute ethanol, filtered and dried. The first diepoxy monomer includes at least one fluorine atom and the second diepoxy monomer includes no fluorine atoms. A diepoxy monomer includes six fluorine atoms (and twelve in the case of $Y^1$). In other embodiments, bisphenols include nitrophenyl hydrazone chromophores. However, other bisphenols include nitrophenyl azo, azomethine, stilbene, thienylene-vinylene, and other chromophores.

In embodiments of the present invention the first diepoxy monomer has a high degree of fluorine atoms including at least one of:

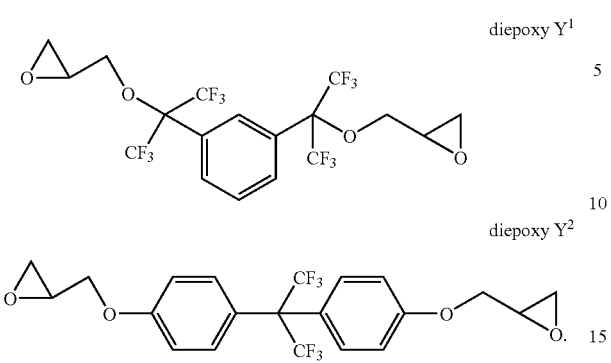

diepoxy Y¹ diepoxy Y²

In other embodiments of the present invention the second diepoxy monomer has no fluorine atoms including at least one of:

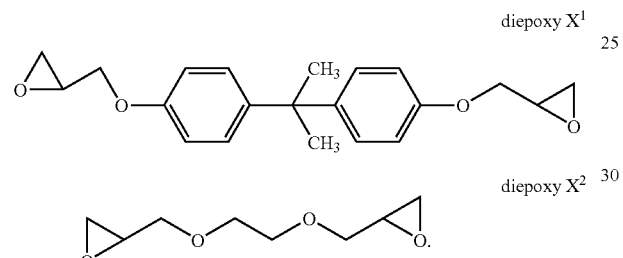

diepoxy X¹ diepoxy X²

In other embodiments, the bisphenol structure includes at least one of:

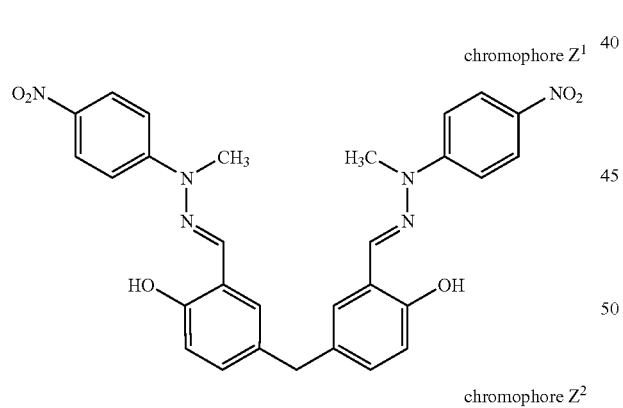

chromophore Z¹ chromophore Z²

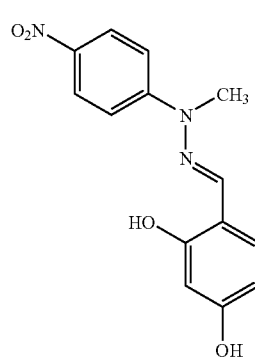

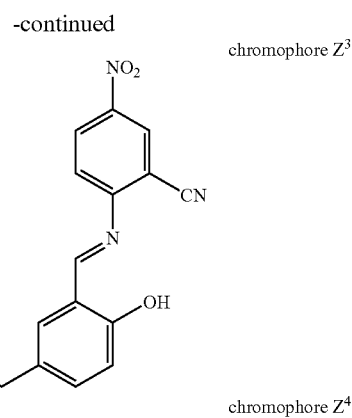

chromophore Z³

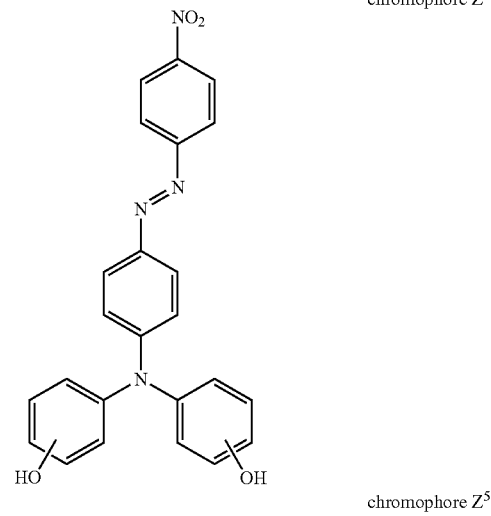

chromophore Z⁴ chromophore Z⁵

EXAMPLE 1

The electro-optic properties of films of the polymers of the invention are achieved by the following process. A solution of the above polymer, typically 10 to 20 wt % of the polymer by weight in cyclohexanone, is spin-cast onto a conductive silicon wafer or a glass microscope slide and baked to remove the residual solvent. A typical baking protocol is 20 minutes at 50° C.; 20 minutes at 80° C.; 20 minutes at 120° C.; and 30 minutes at 150° C. The film on its substrate is then placed on a metal plate acting as the electrical ground and a wire is placed about a centimeter above the film. The film is heated to near its glass transition temperature and a voltage of about 4000 to 8000 Volts, enough to induce a corona in air, is applied to the wire. After about 10 minutes, the temperature of the film is dropped to near room temperature; whereupon the applied electric field is removed. The films thus poled has useful EO properties. [reference: K. D. Singer, et al., Applied Physics Letters 1988, vol. 53, no. 19, pp. 1800.] The film is poled by means of metal electrodes (or indium tin oxide electrodes) contacting the film.

Particular NLO films are crosslinked with a diisocyanate compound to enhance its solvent resistance. The diisocyanate compound is added to the solution used to cast the polymer films. Typical diisocyanate compounds include toluene diisocyanate, isophorone diisocyanate, and methylene dianaline diisocyanate and its hydrogenated analogue.

EXAMPLE 2

The following is an example of polymerizing the monomers to form the polymer. A 250 mL 2-neck round bottom flask (RBF) was charged with 4.80 g (0.0138 mol) diepoxy $X^1$ (BPADGE), 1.80 g (0.0035 mol) diepoxy $Y^1$ (12Fdiepoxy), 9.54 g (0.0172 mol) chromophore $Z^1$ and 21 mL 1-phenoxy-2-propanol. The RBF was placed in an oil bath maintained at 140° C. for 10 minutes. The oil bath temperature was raised to 165° C. After 25 minutes, the temperature of oil bath was at 165° C., and 0.27 g ethyltriphenylphosphonium acetate and 11 mL 1-phenoxy-2-propanol were added to the reaction vessel. The contents were allowed to stir under a positive nitrogen atmosphere for 15 minutes. After 15 minutes, solution was homogenous, red/black in color. The contents were allowed to mix under a nitrogen atmosphere for 45 minutes. After 45 minutes, the solution appeared homogenous, red/black in color and slightly viscous. The contents were cooled to 140° C. and 75 mL dry N,N-dimethylformamide (DMF) was added to quench the reaction. The solution was allowed to cool to room temperature and the contents of the flask were precipitated dropwise into 900 mL methanol (MeOH): 300 mL deionized water (DI water)(3:1, v/v). The resulting polymer suspension was filtered through a Medium porosity glass frit and the polymer was washed with 200 mL DI water and 400 mL MeOH. The polymer was dried in a vacuum desiccator @0.05 Torr 25° C. overnight. After overnight drying, the crude polymer was dissolved in 75 mL dry tetrahydrofuran (THF). The polymer solution was precipitated dropwise into 900 mL MeOH: 300 mL DI water (3:1, v/v). The resulting polymer suspension was filtered through a Fine porosity glass frit and the polymer was washed with 200 mL DI water, 400 mL MeOH. After drying for 2 days @ 0.05 Torr/25° C., an orange powder was obtained in 14.3 g (89% yield).

Referring to FIG. 1, it is shown that the unpoled index of refraction changes as a function of the monomer composition. As the mole percentage of fluorinated monomer increases, the index of refraction decreases. As a result, the index of refraction may be tuned according to the mole percentage of fluorinated monomer to a degree of accuracy of ±0.002 index units between a refractive index of about 1.58 to about 1.65 measured at about 1.3 microns wavelength.

Although the description above contains many specific compounds, these should not be construed as limiting the scope of the invention but as merely providing an illustration of the presently preferred embodiment of the invention. Thus the scope of this invention should be determined by the appended claims and their legal equivalents.

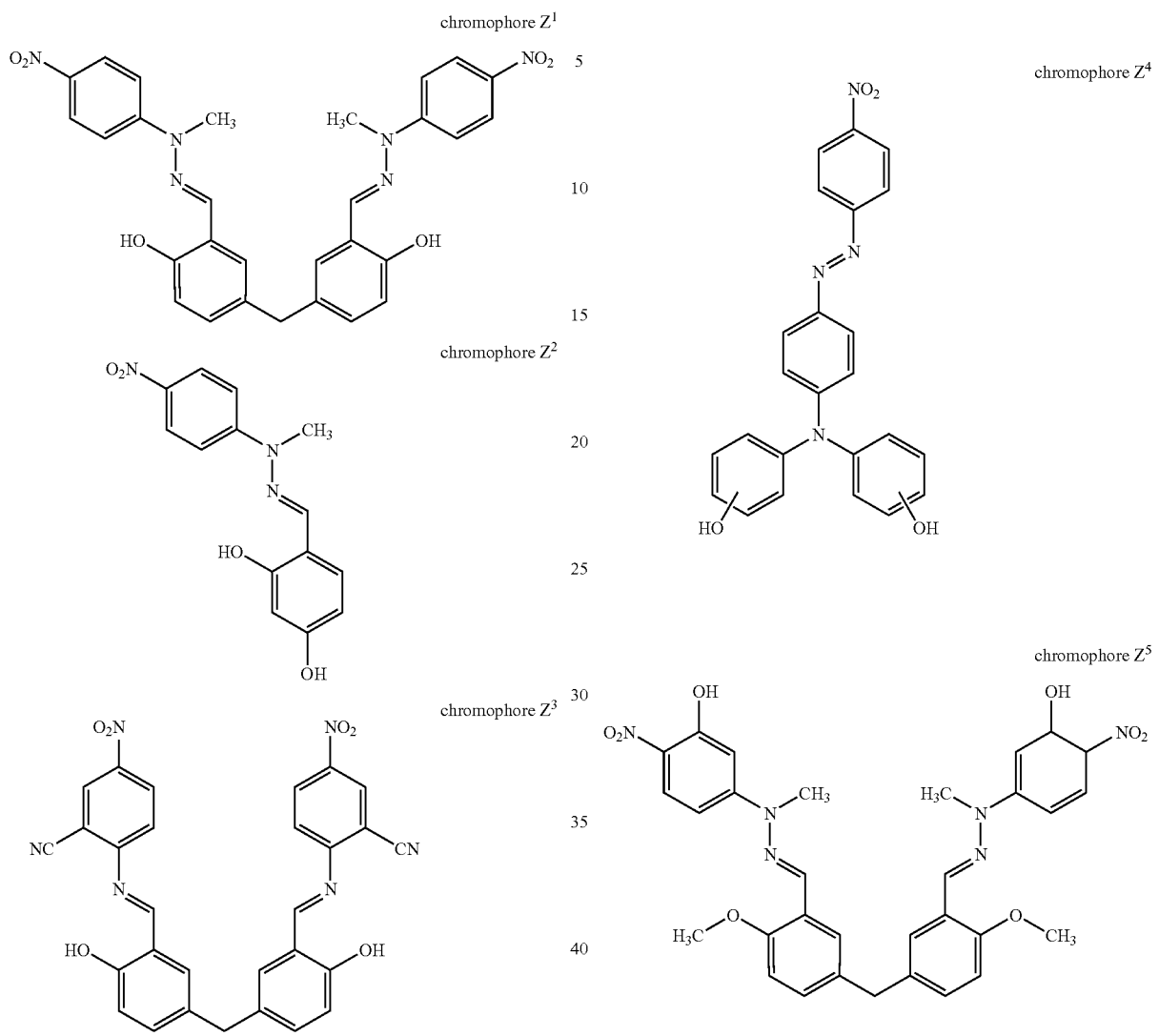

What is claimed is:

1. A linear polymer comprising:
   at least one bisphenol monomer attached to at least one chromophore, and at least one first diepoxy monomer including at least one fluorine atom, and at least one second diepoxy monomer including no fluorine atoms; and
   wherein said linear polymer includes an index of refraction between the range of about 1.58 to about 1.66 measured at a wavelength of about 1300 nm.

2. The polymer according to claim 1, wherein said polymer molecular weight average is between about 10,000 and about 100,000 daltons.

3. The polymer according to claim 1, wherein said bisphenol component further comprises a second chromophore comprising at least one of nitrophenyl azo, azomethine, stilbene, hydrazone, nitrophenyl hydrazone chromophores, and thienylene-vinylene.

4. The polymer according to claim 1, wherein said bisphenol monomer further comprises two nitrophenyl hydrazone chromophores.

5. The polymer according to claim 1, wherein said first diepoxy monomer comprising at least one of:

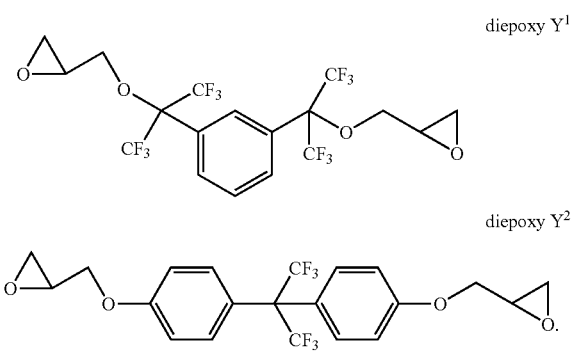

6. The polymer according to claim 1, wherein said second diepoxy monomer comprising at one least of:

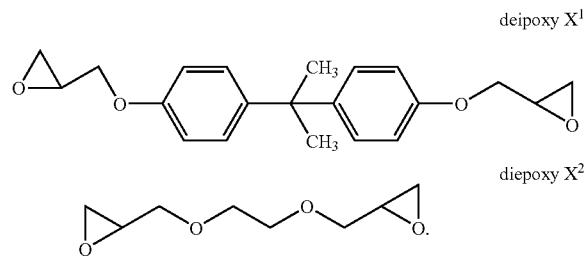

7. The polymer according to claim 1, wherein said bisphenol monomer comprising at least one of: